United States Patent [19]

Hanson et al.

[11] Patent Number: 4,496,510
[45] Date of Patent: Jan. 29, 1985

[54] ACTIVITY TOY

[75] Inventors: Steven P. Hanson, Winnetka; Burton C. Meyer, Downers Grove, both of Ill.

[73] Assignee: Marvin Glass & Associates, Chicago, Ill.

[21] Appl. No.: 550,576

[22] Filed: Nov. 10, 1983

[51] Int. Cl.³ .................. B29C 21/00; B29D 31/00; B29F 3/00
[52] U.S. Cl. .................. 264/176 R; 264/246; 264/255; 264/259; 425/87; 425/113; 425/120; 425/376 R; 434/84; 434/103
[58] Field of Search .................. 264/245-247, 264/176 R, 250, 259, 255; 434/81, 84, 88, 103; 425/110, 120, 130, 87, 376 R, 377, 173, 500

[56] References Cited
U.S. PATENT DOCUMENTS

| | | | |
|---|---|---|---|
| 660,952 | 11/1903 | Hall | 425/376 R |
| 2,485,323 | 10/1949 | Schwartz | 425/130 |
| 3,664,788 | 5/1972 | Greenberg | 425/376 R |
| 3,765,809 | 10/1973 | Farrell | 425/130 |
| 4,199,311 | 4/1980 | Ferris et al. | 425/191 |

Primary Examiner—Willard E. Hoag
Attorney, Agent, or Firm—John S. Pacocha

[57] ABSTRACT

An activity toy with which a child may create needle craft like textured designs using plastic or amorphous solid substances. In order to simulate the strands or nubs that create the textured design in neddle crafts a stand supported on a surface holds a screen having mesh spaces extending between the opposed sides of the screen. The stands hold the screen spaced from the surface with one side of the screen facing the child. An extruder for the plastic substance is positioned adjacent the side of the screen away from the child and moved under the screen to force the substance through the mesh spaces to create the needle craft like texture. The extrusion opening is a larger than the mesh spaces so that a mat or backing retains the textured design on the screen. To facilitate the creation of aesthetically pleasing designs, preprinted patterns or outlines are provided on the screen.

12 Claims, 7 Drawing Figures

U.S. Patent  Jan. 29, 1985  4,496,510
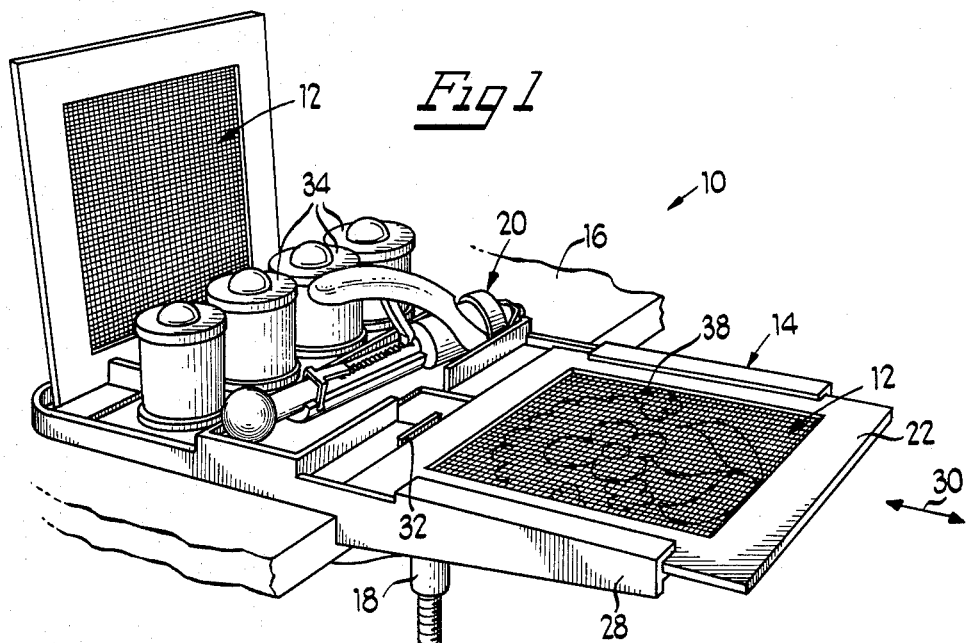
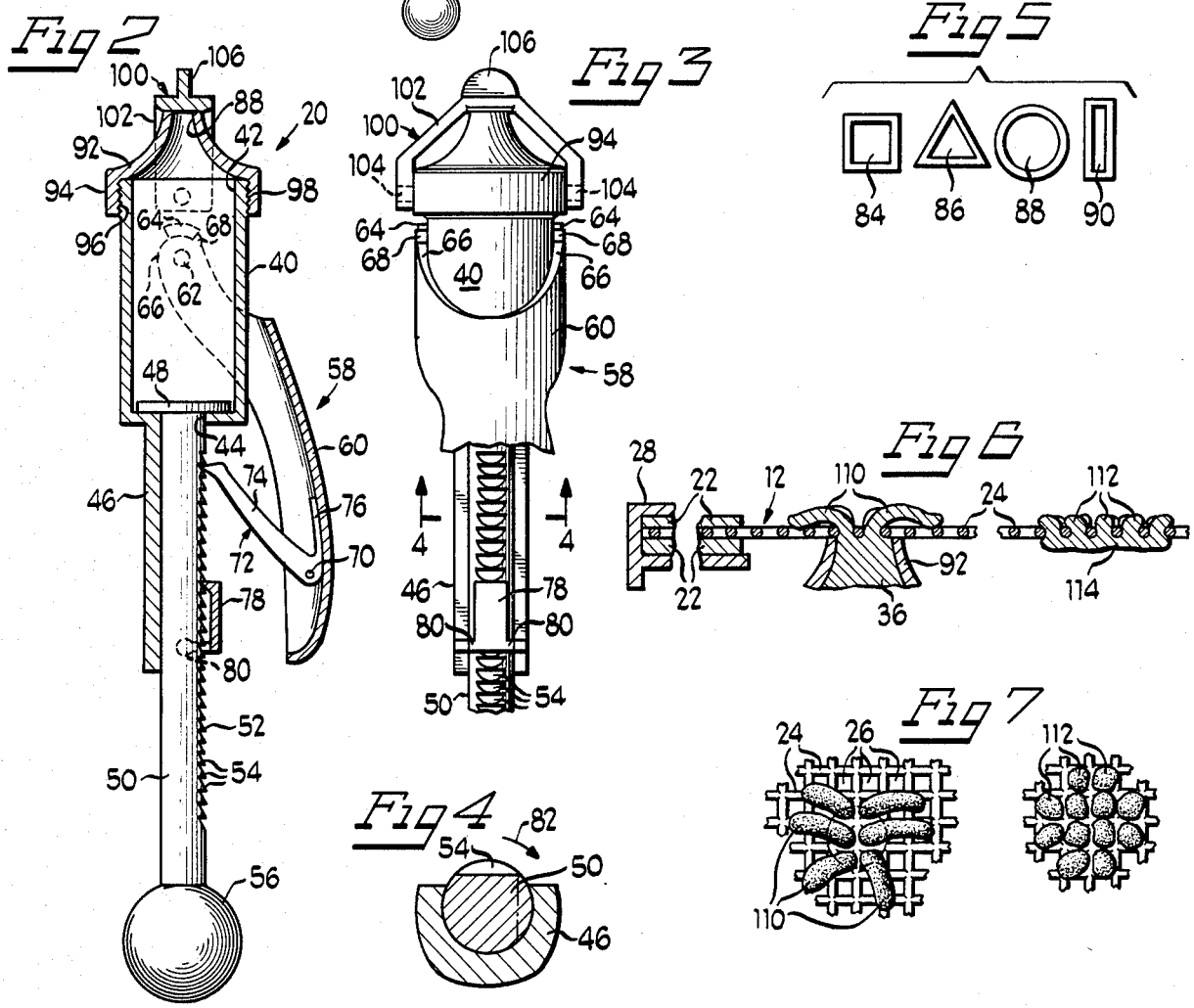

ACTIVITY TOY

BACKGROUND OF THE INVENTION

1. Field of the Invention

This invention relates generally to an activity or craft toy and more particularly to a toy for creating the textured effect of needle crafts using an amorphous solid substance.

2. Background Art

It is well known that much child play emulates adult activity. A popular adult activity involves the creation of decorative textured designs by means of needle crafts such as stitching, needlepoint, latch hook, or candlewicking. However, younger children do not have the coordination and digital dexterity necessary to create such designs, even with the aid of preprinted pattern to follow. In addition, the implements used in such needle crafts are inherently too dangerous for use by younger children. Clay and other plastic or amorphous solid substances have long been a popular medium for providing children with safe entertaining activities and crafts. Prior art toys have provided extruders for clay or similar plastic substances that a child may use in creating design or patterns by depositing dots as in U.S. Pat. No. 3,664,788 or a continuous flow of the material as in U.S. Pat. No. 4,199,311. Such prior art devices, however, do not assist the child in creating a textured effect that emulates the needle crafts of adults.

SUMMARY OF THE INVENTION

The present invention is concerned with providing an activity toy with which a child can create textured designs emulating adult needle crafts such as needlepoint, latch hook and candlewicking by using amorphous substances of the type commercially available for children and recognized to be safe for children to use. This and other objects and advantages of the invention are achieved by a combination of a screen supported in a stand with one side of the screen facing the user and an extruder containing an amorphous substance that may be positioned and moved next to the other side of the screen to force the material through the mesh spaces of the screen to create a needle craft like textured design. The extruder comprises a container with a piston fitting into one end and an opening, which is larger than the screen mesh, at the other end for forcing the substance through the mesh spaces. Additional interchangeable and sealable openings of different shapes are also provided. Preprinted patterns or outlines may be provided on the screen for the child to fill in using the extruder.

BRIEF DESCRIPTION OF THE DRAWING

For a better understanding of the present invention reference may be had to the accompanying drawing in which:

FIG. 1 is a perspective view of an embodiment of the present invention;

FIG. 2 is an enlarged scale, side elevational view, partially in section, of the extruder shown in FIG. 1;

FIG. 3 is an enlarged scale, fragmentary front elevational view of the extruder shown in FIG. 1;

FIG. 4 is an enlarged scale sectional view taken generally along the line 4—4 of FIG. 3;

FIG. 5 is an enlarged scale top plan view of various interchangeable openings for the extruder;

FIG. 6 is an enlarged scale, fragmentary sectional view of the present invention in operation; and FIG. 7 is a top plan view of portions of the screen shown in FIG. 6.

DETAILED DESCRIPTION OF THE PREFERRED EMBODIMENT

Referring now to the drawing in which like parts are designated by like reference numerals throughout the several views, there is shown in FIG. 1 an activity toy 10 which includes a screen 12 held in a stand 14 supported upon but spaced from a surface 16 such as a table or the like. A C-clamp 18 on the underside of the stand 14 is used to secure the stand to a table top or other similar support surface 16. Thus, the screen 12 is supported spaced from the surface 16 so that a hand held portable extruder 20 may be positioned and operated under the screen 12.

Preferably screen 12 is contained within a border or frame 22. A plurality of strings 24 of metal or plastic material are interwoven to form substantially congruent square mesh spaces 26. Alternatively, circular or other shapes of mesh spaces may be punched out of a sheet of material to form the screen. As shown in FIGS. 1 and 6 the screen 12, or more particularly the border 22, fits within the inwardly directed channels of the cantilevered, "F" shaped channel members 28 from the front of the stand, and removed in the opposite manner, as indicated by the arrows 30 in FIG. 1. To help position the screen 12, a rear stop 32 is provided against which the screen abuts when it is pushed into the stand 14.

Conveniently, the stand is formed with a number of different compartments for the extruder 20, several containers 34 of a plastic or amorphous solid substance 36 of the type commercially available for providing children with a safe medium for various craft activities. One example of such a substance useable with this invention is marketed by the Kenner Products Division of CPG Products Corp. under the registered trademark "PLAY-DOH". Stand 14 may also provide storage space for additional screens 12 as shown in FIG. 1. Enjoyment of the present invention is facilitated by providing a preprinted pattern or outline such as 38 on the screen which the child may then fill in with the substance 36 using the extruder 20 to make the textured design.

Extruder 20 includes a hollow, generally circular cylindrical container 40 into which the plastic substance 36 may be inserted through the upper top fill opening 42. While the upper fill opening 42 is substantially the same size as the container 40 to facilitate filling of the container, the bottom portion of the container 40 has restricted opening 44. Integrally formed as part of the container 40 is a downwardly depending "C" shaped sleeve 46. The inside circumference of sleeve 46 is the same as and in line with the circumference of the opening 44.

A piston 48 in a form of a circular cylindrical disk of a diameter slightly less than the inside diameter of the container 40 is used to force or extrude the substance 36 out of the container. Piston 48 is secured to an elongated rod 50 having a rack 52 with ratchet teeth 54 extending along most of the length of the rod 50 intermediate the ends. The rod 50 is received in the sleeve 46 for reciprocal movement. At the end of the rod 50 opposite the piston 48, a ball 56 is provided to facilitate pulling the rod and piston back down to the bottom of the container.

Pumping handle 58 is provided to push the rod 50 and piston 48 up into the container to extrude the plastic substance 36. On the outside of the container 40 a handle 60 is mounted on a pair of diametrically opposed projections 62. The projections 62 may be secured to the exterior of the container 40 by means of an adhesive or ultrasonic welding, or may be even integrally formed with a container 40. Above each of the projections 62 is a small arcuate shoulder 64 that may be attached to the container 40 in a like manner to the projections 62. Adjacent each of the upper rounded ends 66 of the handle is an aperture that fits over a projection 62 to pivotally mount the handle. A small projecting tab 68 at each of the ends 66 engages the shoulder 64 to limit the upward and outward pivotal movement of the handle 60 about the projections 62.

Secured nearer the lower end of the handle 60 by a pin 70 is a "V" shaped pumping pawl 72 of a relatively resilient material. The free end of one leg 74 of the "V" engages the ratchet teeth 54 while the other leg 76 lies along the inside back of the handle 60. When the handle 60 is pushed toward the sleeve 46, the legs 74 and 76 are compressed together about the bottom of the "V" creating a biasing force and the free end of leg 74 engages one of the ratchet teeth 54 and pushes the rod 50 and the piston 48 up into the container 40. Upon release of the handle 60 the biasing force urges the handle to return permitting the leg 74 to drop down to the next one of the ratchet teeth 54. Engagement of the tab 68 with the shoulder 64 prevents the handle from being returned outwardly too great a distance.

In order to prevent the piston 48 and rod 50 from moving downwardly when the handle 60 is released, retaining pawl 78 is provided. Integrally formed gudgeons 80 fit into apertures in the sidewalls of the "C" shaped sleeve 46 to mount the pawl 78 in a relatively fixed position. The retaining pawl 78 is maintained in engagement with the ratchet teeth 54 of the rack 52 even when the pumping pawl moves out of engagement of the teeth. To retract the piston 48 and rod 50, the rod is turned as indicated by the arrow 82 in FIG. 4 to rotate the outwardly facing ratchet teeth 54 back into the sleeve 46 and out of engagement with both the pawls 72 and 78.

For the purpose of directing the outward flow of the plastic substance 36 as it is pushed out of the container 40 by the piston 48 a number of interchangeable extrusion openings 84, 86, 88 and 90 are provided. Each of the extrusion openings is formed on the small end of a funnel shaped cap 92 having a collar 94 adjacent the larger circular opening. Internal threads 96 on the collar 94 engage external threads 98 on the exterior wall of the container 40 adjacent the fill opening 42. During operation of the extruder 20 there is a tendency for built up pressure in the container 40 continuing to force the material 36 out through the extrusion openings even after pumping of the handle has stopped. To control such undesired flow of the extruded material a pivotally mounted seal 100 is provided to close the extrusion opening. The seal 100 has a generally "U" shaped strap 102 with apertures adjacent the free ends that fit over a trunnion 104 extending out from the collar 94. A tab 106 facilitates pivoting the inside of the bight of the seal 100 into and out of an extrusion opening sealing position.

In order to create a needle craft like textured design with the present invention, a screen 12 containing a preprinted outline such as the flower 38 is inserted into the stand with one of the opposed sides of the screen toward the user. After a suitable plastic substance is inserted into the container 40 and the seal 100 is pivoted out of the way, the portable extruder 20 is positioned on the opposite side of the screen as permitted by the stand 14. The handle 60 of the extruder is pumped to force the plastic substance out through the selected extrusion openings 84–90 and the portable extruder moved within the preprinted outline 38 to fill in the outlined areas of the pattern with strands of the material forced up through the mesh spaces 26 of the screen 12. Since the commercially available plastic substances specifically sold for use in play by children come in a variety of colors, the different colors may be used to fill in various areas of the preprinted pattern. Changing from one color to another of a plastic substance is facilitated by the removal of the cap 92 to permit the remaining material 36 within the container 40 to be pushed out with a single stroke of the piston by manual force exerted on the ball handle 56.

As is shown in FIGS. 6 and 7 when the tip of the funnel cap 92 is positioned adjacent one side of the screen 12 and the material 36 is pushed out of the opening in the tip of the cap, the plastic substance is forced through a number of the mesh spaces. The resulting long strands 110 or short nubs 112 resemble the pieces of yarn or thread forming the textured design of the adult crafts made by needlepoint, latch hook, or candlewicking. Each of the extrusion openings 84–90 has at least one dimension that is longer than the side of any of the square mesh spaces 26. Thus, while a portion of the extruded material comes out of the side of the screen 12 facing the child to form the long strands 110, or the shorter nubs 112 if the extruder 20 is moved more rapidly, a mat or backing 114 remains on the side of the screen adjacent the extrusion opening to help retain the extruded plastic substance in place about the screen 12.

While a particular embodiment of the invention has been shown and described with some alternatives, it will be apparent to those skilled in the art that further changes and modifications may be made without departing from the invention. It is intended in the appended claims to cover all such changes and modifications as fall within the true spirit and scope of the invention.

What is claimed as new and desired to be secured by Letters Patent is:

1. A method of creating a textured design using an extrudable substance comprising the steps of:
   filling an extruder having an extrusion opening with an extrudable substance;
   positioning a screen with opposed sides and mesh spaces extending between the opposed sides so that one of the sides faces the user;
   positioning the extruder with the extrusion opening adjacent the opposite side of the screen;
   operating the extruder to cause extrusion of the plastic material through the opening and through the mesh spaces aligned with the opening; and
   moving the extruder along the opposite side of the screen to force the plastic substance through a desired pattern of mesh openings thereby creating a textured design viewable from the side of the screen facing the user.

2. The method of claim 1 including the further steps of extruding another, visually different, extrudable substance through unfilled mesh spaces of the screen.

3. The method of claim 1 including the step of using a screen having a preprinted outline of a design to be completed by forcing the extrudable substance through the mesh spaces.

4. An activity toy comprising in combination:
a plastic substance;
a movable extruder having a container with an opening;
means permitting insertion of the plastic substance into the container;
means for forcing the plastic substance out of the container through the opening;
a screen with opposed sides; and
stand means supportable on a surface for holding the screen sufficiently spaced from the supporting surface with one side of the screen facing the user while permitting positioning of the opening adjacent the other side for operation and movement of the extruder.

5. The activity toy of claim 4 in which the screen has a preprinted outline.

6. The activity toy of claim 4 in which the mesh spaces are substantially congruent.

7. The activity toy of claim 4 in which the mesh spaces are square.

8. The activity toy of claim 4 in which the screen has strands forming mesh spaces that are substantially congruent squares and the length of the side of a square space is at least as great as the thickness of the strands.

9. The activity toy of claim 4 in which the extruder includes means for sealing the opening.

10. The activity toy of claim 4 including clamp means for securing the stand means on the surface.

11. The activity toy of claim 4 in which the screen has mesh spaces of a predetermined size; and
the extruder opening has at least one dimension larger than the greatest dimension of the mesh spaces.

12. The activity toy of claim 11 in which the one dimension of the extruder opening is approximately equal to twice the greatest dimension of the mesh spaces.

* * * * *